UNITED STATES PATENT OFFICE.

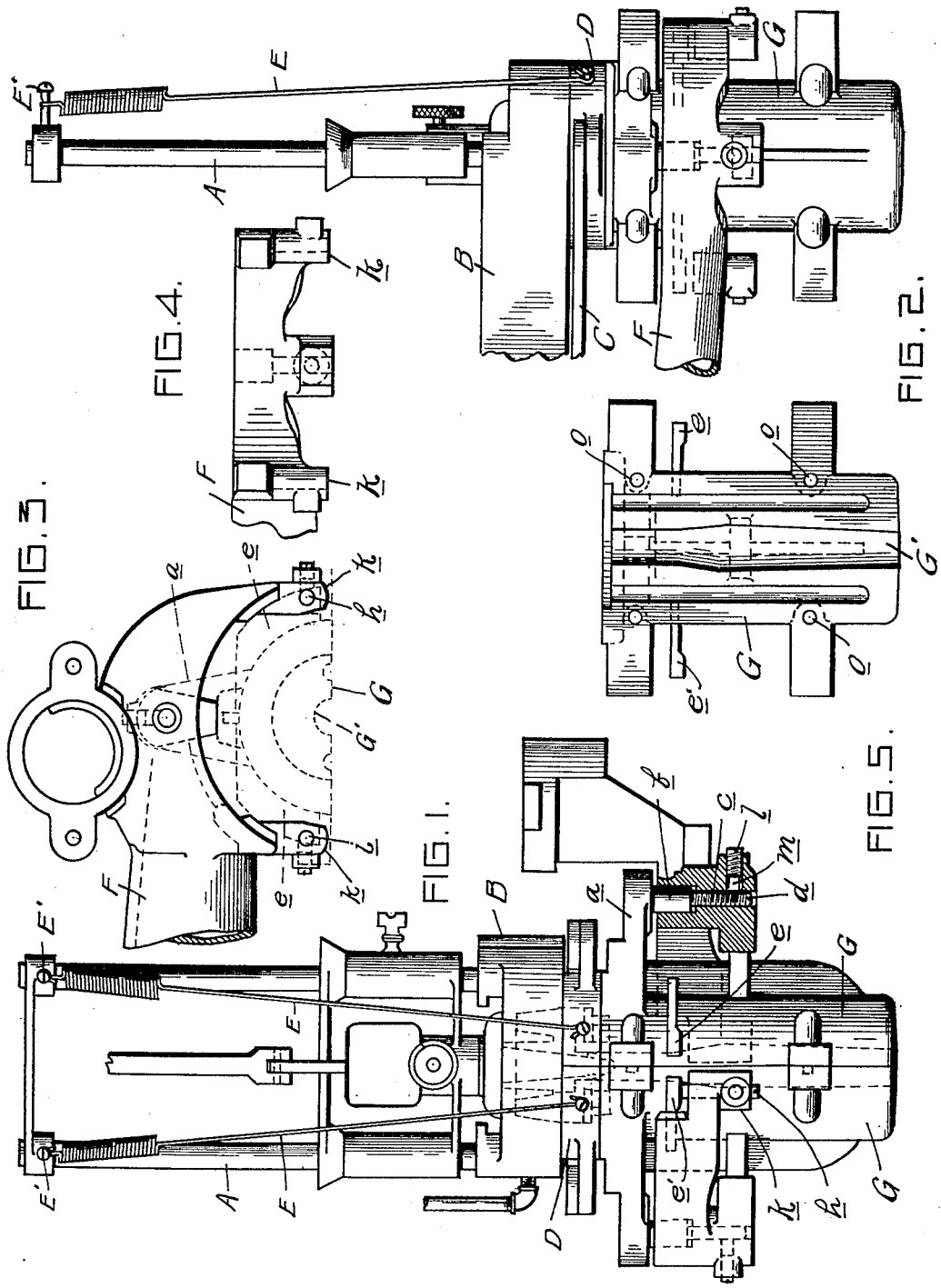

WILLIAM EMIL BOCK, OF TOLEDO, OHIO, ASSIGNOR TO THE TOLEDO GLASS COMPANY, OF TOLEDO, OHIO, A CORPORATION OF OHIO.

MOLD FOR GLASS-SHAPING MACHINES.

No. 852,099.     Specification of Letters Patent.     Patented April 30, 1907.

Application filed August 25, 1906. Serial No. 332,032.

*To all whom it may concern:*

Be it known that I, WILLIAM EMIL BOCK, a citizen of the United States of America, residing at Toledo, in the county of Lucas and State of Ohio, have invented certain new and useful Improvements in Molds for Glass-Shaping Machines, of which the following is a specification, reference being had therein to the accompanying drawings.

The invention relates to new and useful improvements in molds for glass-shaping machines, and consists in a means for supporting the sections of a sectional mold so that they may be adjusted perfectly—that is, so that the two meeting faces will come together in perfect alinement, and further in means for holding the neck molds in contact with the blowing head, and further in the construction, arrangement and combination of the various parts, as more fully hereinafter described and particularly pointed out in the claims.

In the drawings herein I have shown portions of a machine of the general type shown in the patent to M. J. Owens, No. 766,768, dated August 2, 1904, and of the specific type shown in my former application Serial 258,562, filed May 2, 1905. In machines of the types referred to the two sections of a blank mold are carried on the end of the supporting arms, which are actuated by suitable mechanism to open and close the mold. The blank mold, connected with a suitable sectional neck mold, is then brought with its open lower end into proximity to a mass of molten glass, and a vacuum or partial vacuum produced in the cavity of the mold so as to suck the mold full of glass and form a blank. In such a machine it is essential that the meeting faces of the blank mold shall be in perfect alinement to make a tight joint so as to prevent the destruction of the vacuum, which would prevent the filling of the blank mold in the sucking operation, or only imperfectly fill it.

In the drawings, Figure 1 is a front elevation of a portion of the frame of a glass-shaping machine of the type referred to, showing the blowing head or blowing head arm, the neck mold, and the blank mold, and also the arms or members which support the sections of these molds. At the right hand a part of a supporting member is shown in section, to more clearly illustrate the construction. Fig. 2 is a side elevation of the parts shown in Fig. 1; Fig. 3 is a plan view of the outer end of the movable arm which carries one section of the blank mold, showing in dotted lines such section; Fig. 4 is an elevation of the inner face of the outer end of the supporting arm for the blank mold section; Fig. 5 is an elevation of the blank mold.

A represents a portion of the frame of the machine, B the blowing head arm. In a machine of this type this blowing head arm has suitable passages and connections with a source of rarefied air, and also with a source of air under pressure, so that at the proper point in the operation of the machine the mold cavity can be connected with the rarefied air or vacuum producing means to form the blank, and at another period with air under pressure, to blow the blank to its completed form; but as this has nothing to do with my present invention, I do not deem it necessary to illustrate the details thereof.

C are levers suitably journaled, and with suitable means for actuating them, carrying at their outer ends the section D of the neck-mold. In order to keep these sections tightly against the under face of the blowing head B, for the purpose of preventing leakage of the air in or out, accordingly as the vacuum or air pressure connection is made, I connect to each of these sections a spring or spring link E, the other end of the spring being connected to a stationary abutment, such as the screw E', at some suitable point of the frame. It will be obvious that the tension of the spring will at all times hold the upper face of the neck mold sections tightly against the under face of the blowing head B.

F are movable members or arms, each carrying at its outer end a section G of the blank mold, the blank mold having a cavity G', shown in Fig. 5, in which the blank is to be formed. The two sections being alike, a description of one will suffice for both. Near the upper part of the blank mold section, and centrally between the two edges thereof, is a lateral lug *a*, provided with a downwardly extending pin *b*, which enters a recess *c* formed in the middle portion of the outer end of the supporting member or arm. *d* is an adjusting screw, engaging a suitable screw-threaded aperture and projecting with its end into the socket *c* and adapted to bear against the pin *b*, so that by adjusting the screw up or down the point of support of the lug a will be raised or lowered. At the forward and rear edges of the mold section are the lugs e e', which bear upon the adjusting screws h and i, which pass vertically through the extensions k, extending outwardly from the outer end of the supporting member or arm F. It is obvious that by adjusting these screws up or down the mold will be correspondingly angularly adjusted. I provide preferably some means of locking the adjusting screws after they have been properly adjusted, and I have shown for this purpose the set-screws l, engaging with a wooden or other soft block m, which in turn impinges against the adjusting screw. It will be seen from the description of these parts that each mold section is supported by three separated bearing points, and that adjusting means are provided so that the mold can be angularly adjusted not only to obtain perfect alinement between the meeting faces of the mold sections, but also to obtain perfect alinement between the edges of the mold cavity, and thus assure a perfect contact to prevent leakage and also a perfect adjustment to form an accurately-shaped blank. It also provides means for adjusting the mold section vertically, so as to stand in just the proper relation to the neck mold to make a tight joint with the under face thereof. These parts are ordinarily made very closely, so that so far as angular adjustment is concerned an exceedingly small amount is required, but it is obvious that quite a degree of vertical adjustment may be necessary for different-sized molds, and this is provided for with this construction. I have shown in the faces of the mold sections dowel pins o, adapted to engage corresponding recesses in the companion sections.

What I claim is,—

1. In a glass shaping machine, the combination of a sectional mold, movable members or arms carrying the sections, and means for angularly adjusting the molds on the carrying members.

2. In a glass shaping machine, the combination of a section of a sectional mold, a movable member or arm carrying said section, a plurality of bearing points between the section and its carrying member, and means for adjusting the mold section upon its bearing points.

3. In a glass shaping machine the combination of a sectional mold, a movable member or arm carrying said section, a plurality of separated adjustable bearings on the arm, and complementary bearings on the mold section.

4. In a glass shaping machine, the combination of a section of a sectional mold, a movable member or arm carrying said section, a plurality of bearing points located at the front and rear edges and intermediate such front and rear edges of said mold section, complementary bearings on the arm, and means for adjusting the mold section upon its bearings.

5. In a glass shaping machine of the kind described, the combination of a frame, a blowing head arm thereon, sectional neck molds movable beneath said arm, and springs connected to the frame and to said neck mold sections acting to hold the face of the neck mold tightly against the arm.

6. In a glass shaping machine, the combination of a sectional mold, movable members or arms carrying the sections, and means for angularly and vertically adjusting the molds on the carrying members.

In testimony whereof I affix my signature in presence of two witnesses.

WILLIAM EMIL BOCK.

Witnesses:
R. LA FRANCE,
S. E. BUTLER.